(12) United States Patent
Kuroki

(10) Patent No.: US 8,842,164 B2
(45) Date of Patent: Sep. 23, 2014

(54) IMAGE PICKUP APPARATUS AND VIDEO RECORDING AND REPRODUCTION SYSTEM

(75) Inventor: Yoshihiko Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 12/739,102

(22) PCT Filed: Aug. 26, 2009

(86) PCT No.: PCT/JP2009/064826
§ 371 (c)(1),
(2), (4) Date: Apr. 21, 2010

(87) PCT Pub. No.: WO2010/024270
PCT Pub. Date: Mar. 4, 2010

(65) Prior Publication Data
US 2010/0245546 A1    Sep. 30, 2010

(30) Foreign Application Priority Data

Aug. 29, 2008  (JP) ................................. 2008-221060
Jul. 29, 2009  (JP) ................................. 2009-176212

(51) Int. Cl.
| | |
|---|---|
| H04N 13/02 | (2006.01) |
| H04N 9/82 | (2006.01) |
| H04N 5/783 | (2006.01) |
| G03B 35/10 | (2006.01) |
| H04N 5/91 | (2006.01) |
| H04N 5/77 | (2006.01) |

(52) U.S. Cl.
CPC ....... *H04N 13/0239* (2013.01); *H04N 13/0296* (2013.01); *H04N 9/8227* (2013.01); *H04N 5/783* (2013.01); *G03B 35/10* (2013.01); *H04N 5/91* (2013.01); *H04N 5/772* (2013.01)

USPC .............................................. 348/46; 348/42

(58) Field of Classification Search
CPC ............................... H04N 7/0239; H04N 7/02
USPC ....................... 352/57, 58, 59, 60; 348/42–50
See application file for complete search history.

(56) References Cited

U.S. PATENT DOCUMENTS 2,413,996 A * 1/1947 Ramsdell ....................... 396/331
5,539,572 A * 7/1996 Greenberg et al. ............ 359/368

(Continued)

FOREIGN PATENT DOCUMENTS

| GB | 2 256 992 A |   | 12/1992 |
|---|---|---|---|
| GB | 2256992 A | * | 12/1992 |

(Continued)

OTHER PUBLICATIONS

International Search Report from the Japanese Patent Office in International Application No. PCT/JP2009/064826 mailed Dec. 8, 2009.

*Primary Examiner* — Sath V Perungavoor
*Assistant Examiner* — Matthew J Anderson
(74) *Attorney, Agent, or Firm* — Finnegan Henderson Farabow Garrett & Dunner LLP

(57) ABSTRACT

A light ray output from a subject is separated into left and right light rays by mirrors in an area in which a diverging light ray output from a point of the subject is converted into a parallel light ray. When a subject is looked at from the right side or the left side, the light rays are reflected by various mirrors. The light rays reflected by the mirrors are made incident on image forming lenses. These light rays form an image on a light receiving surface of an imaging device. In this way, a high-quality 3D image having an appropriate parallax level and a small chromatic aberration is captured.

7 Claims, 6 Drawing Sheets

(56) References Cited

U.S. PATENT DOCUMENTS

| | | | | |
|---|---|---|---|---|
| 5,557,454 | A | * | 9/1996 | Takahashi .................... 359/378 |
| 5,976,071 | A | | 11/1999 | Sekiya |
| 6,020,993 | A | * | 2/2000 | Greenberg ................... 359/363 |
| 6,338,711 | B1 | | 1/2002 | Sekiya et al. |
| 6,517,479 | B1 | | 2/2003 | Sekiya et al. |
| 6,545,741 | B2 | * | 4/2003 | Meltzer ........................... 352/62 |
| 7,388,719 | B2 | * | 6/2008 | Yamazaki .................... 359/694 |
| 7,483,049 | B2 | * | 1/2009 | Aman et al. .................. 348/162 |
| 2004/0036800 | A1 | | 2/2004 | Ohki |
| 2006/0268152 | A1 | * | 11/2006 | Uchiyama et al. ............ 348/362 |
| 2007/0097206 | A1 | * | 5/2007 | Houvener et al. ............... 348/26 |
| 2008/0158369 | A1 | | 7/2008 | Watanabe |
| 2008/0303941 | A1 | | 12/2008 | Ohki |
| 2012/0026300 | A1 | * | 2/2012 | Kakiuchi et al. ................ 348/49 |
| 2012/0206576 | A1 | * | 8/2012 | Sato et al. ....................... 348/46 |
| 2013/0063569 | A1 | * | 3/2013 | Sato et al. ....................... 348/46 |

FOREIGN PATENT DOCUMENTS

| | | | | |
|---|---|---|---|---|
| GB | 2284903 | A | * | 6/1995 |
| JP | 63098650 | A | * | 4/1988 |
| JP | 5-7374 | | | 1/1993 |
| JP | 5-188502 | | | 7/1993 |
| JP | 6-202006 | | | 7/1994 |
| JP | 06202006 | A | * | 7/1994 |
| JP | 8-15616 | | | 1/1996 |
| JP | 08015616 | A | * | 1/1996 |
| JP | 8-152568 | | | 6/1996 |
| JP | 08152568 | A | * | 6/1996 |
| JP | 2004-88244 | | | 3/2004 |
| JP | 2004312545 | A | * | 11/2004 |
| JP | 2008-167064 | | | 7/2008 |
| JP | 2008292513 | A | * | 12/2008 |

* cited by examiner

FIG. 4

| LENS | LENS SPECIFICATION | | | CONDITION | | INTER-CENTROID DISTANCE [mm] (THEORETICAL VALUE) | BASELINE [mm] (EXPERIMENTAL VALUE) |
|---|---|---|---|---|---|---|---|
| | FULL-APERTURE F VALUE | FOCAL LENGTH [mm] | ZOOM RATIO [MAGNIFICATION] | FOCAL LENGTH [mm] | CAMERA-TO-SUBJECT DISTANCE [m] | | |
| #A | 1.8 | 10 TO 100 | 10 | 100 | 6.5 | 23.6 | 20.0 |
| #B | 2.8 | 13.5 TO 570 | 42 | 100 | 6.5 | 15.2 | 12.0 |

(a)

(b)

IMAGE PICKUP APPARATUS AND VIDEO RECORDING AND REPRODUCTION SYSTEM

CROSS REFERENCE TO RELATED APPLICATIONS

This application is a national phase application based on PCT/JP2009/064826, filed Aug. 26, 2009, which claims the priority of Japanese Patent Application Nos. 2008-221060, filed Aug. 29, 2008 and 2009-176212, filed Jul. 29, 2009, the contents of all of which are incorporated herein by reference.

TECHNICAL FIELD

The present invention relates to an image pickup apparatus and a video recording and reproduction system and, in particular, to an image pickup apparatus and a video recording and reproduction system that capture an image of a subject in the form of a 3D image.

BACKGROUND ART

A system that displays a 3D image by capturing the image of the same subject using two video cameras disposed in the left and right sides and outputting the left and right images at the same time has been developed. However, if such two video cameras are used, the size of an apparatus including the cameras is increased and, therefore, the apparatus is not practical. Additionally, in general, the baseline extending between the two cameras, that is, a distance between two eyes of the 3D camera is set to about 65 mm, which corresponds to the distance between the eyes of a person. In such a case, the parallax is increased when a zooming operation is performed on the video image, and the human eye system is forced to perform information processing that is not performed as usual. Accordingly, eye fatigue occurs. In addition, if the right and left images are directly overlaid and are looked at, the image is doubly-blurred and, therefore, an unnatural video is generated. Note that L and R represent the positions of the two eyes, and A and B represent points on the subject. Then, angles LAR and LBR are defined as absolute parallaxes, and (angle LAR-angle LBR) is defined as a relative parallax of the point A to the point B. Hereinafter, the term "relative parallax" is simply referred to as "parallax".

Therefore, a prism 3D camera that separates a light ray output from a subject and captured by a single video camera into left and right rays using a prism has been developed (refer to, for example, Patent Document 1).

PRIOR ART REFERENCES

Patent Document

Patent Document 1: Japanese Unexamined Patent Application Publication No. 5-7374 (FIG. 1).

DISCLOSURE OF INVENTION

Problems to be Solved by the Invention

In the above-described existing technique, a prism is disposed in front of a lens of a single video camera, and a light ray is separated into two light rays having a parallax in the left-right direction with respect to the optical axis. However, in such prism 3D cameras, a light-shielding mask needs to be formed on the prism in order to remove an overlapping portion of the left and right images. Accordingly, control performed when a 3D image is captured is complicated. In addition, a prism uses refraction of an optical axis, and the index of refraction varies in accordance with the wavelength of a light ray. Accordingly, chromatic aberration occurs, which is problematic. Furthermore, in the above-described existing technique, the optical path is bent in an area other than an area in which the light ray is converted into a parallel light ray in a path from an optical system to an imaging device. Accordingly, when a zoom operation of an image-capturing lens is performed, the optical axis is changed in accordance with the zoom ratio. As a result, each of the positions of images formed on two imaging devices is moved, which is problematic.

Accordingly, it is an object of the present invention to capture a high-quality 3D image having an appropriate parallax level and a small chromatic aberration.

Means for Solving the Problems

To solve the above-described problems, according to a first aspect of the present invention, an image pickup apparatus includes an image-capturing lens configured to collect a light ray output from a subject, a relay lens configured to transmit the collected light ray, an aperture configured to control an amount of the transmitted light in an area in which a diverging light ray output from a point of the subject is converted into a parallel light ray, a mirror configured to separate, into left and right rays, the light ray having the amount of light controlled in the area in which a diverging light ray output from a point of the subject is converted into a parallel light ray, two image-forming lenses configured to form images from the separate light rays, and two imaging devices configured to convert the light rays forming the images into images in the form of electronic signals. In this way, a light ray collected by a single image capturing lens is separated by a mirror, and a high-quality 3D image having an appropriate parallax level and a small chromatic aberration is advantageously captured. In addition, the optical axis is not practically changed in accordance with the zoom ratio of the image capturing lens. Accordingly, image processing, such as moving the position of an image in accordance with the zoom ratio, is not needed and, therefore, a high-precision zoom effect can be easily obtained.

In addition, in the first aspect, the aperture may control the amount of the transmitted light so as to change a distance between optical axes of the two separate light rays. That is, by controlling the amount of light using the aperture, a distance between optical axes of the two separate light rays can be changed.

In addition, in the first aspect, the aperture may control the amount of the transmitted light so that a distance between optical axes of the two separate light rays ranges from about 7 to about 65 millimeters. That is, by adjusting the amount of light using the aperture, a distance between the optical axes of the separate light rays can be changed so as to range from about 7 to about 65 millimeters.

In addition, in the first aspect, the image-capturing lens includes a zoom lens that enlarges the light ray output from the subject, and a relative parallax between the two images converted by the imaging devices may be controlled by the zoom lens. In this way, the relative parallax between the images can be controlled by the zoom lens.

In addition, in the first aspect, each of the plurality of imaging devices may generate captured images from the electronic signals at a rate of 60 frames per second or higher. It is desirable that each of the plurality of imaging devices generate captured images from the electronic signals at a rate ranging from 230 to 250 frames per second. In this way, the occurrence of blur and jerkiness caused by motion can be prevented. In addition, for a moving subject, a sufficient time resolution can be provided, and correct outline information can be captured.

Furthermore, according to a second aspect of the present invention, a video recording and reproduction system is provided. The video recording and reproduction system includes an image-capturing lens configured to collect a light ray output from a subject, a relay lens configured to transmit the collected light ray, an aperture configured to control an amount of the transmitted light in an area in which a diverging light ray output from a point of the subject is converted into a parallel light ray, a mirror configured to separate, into left and right rays, the light ray having the amount of light controlled in the area in which a diverging light ray output from a point of the subject is converted into a parallel light ray, two image-forming lenses configured to form images from the separate light rays, two imaging devices configured to convert the light rays forming the images into images in the form of electronic signals, a video recording unit configured to record the images converted by the two imaging devices in a storage unit in the form of left and right video data frames, and a video reproduction unit configured to reproduce and display the left and right video data recorded in the storage unit at the same time. In this way, a light ray collected by a single image-capturing lens can be separated into separate light rays by the mirror, and a high-quality 3D image having an appropriate parallax level and a small chromatic aberration can be recorded and reproduced.

Advantageous Effects

According to the present invention, a 3D image having an appropriate parallax level and a small chromatic aberration can be advantageously captured.

BRIEF DESCRIPTION OF DRAWINGS

FIG. 4 illustrates a relationship between an inter-centroid distance and the baseline.

BEST MODES FOR CARRYING OUT THE INVENTION

Embodiments of the present invention (hereinafter referred to as "embodiments") are described below. The descriptions will be made in the following order:
1. First Embodiment (Example of Image Pickup Apparatus)
2. Second Embodiment (Example of Video Recording and Reproduction Apparatus)

1. First Embodiment

Example of Configuration of Image Pickup Apparatus

Figure 1:
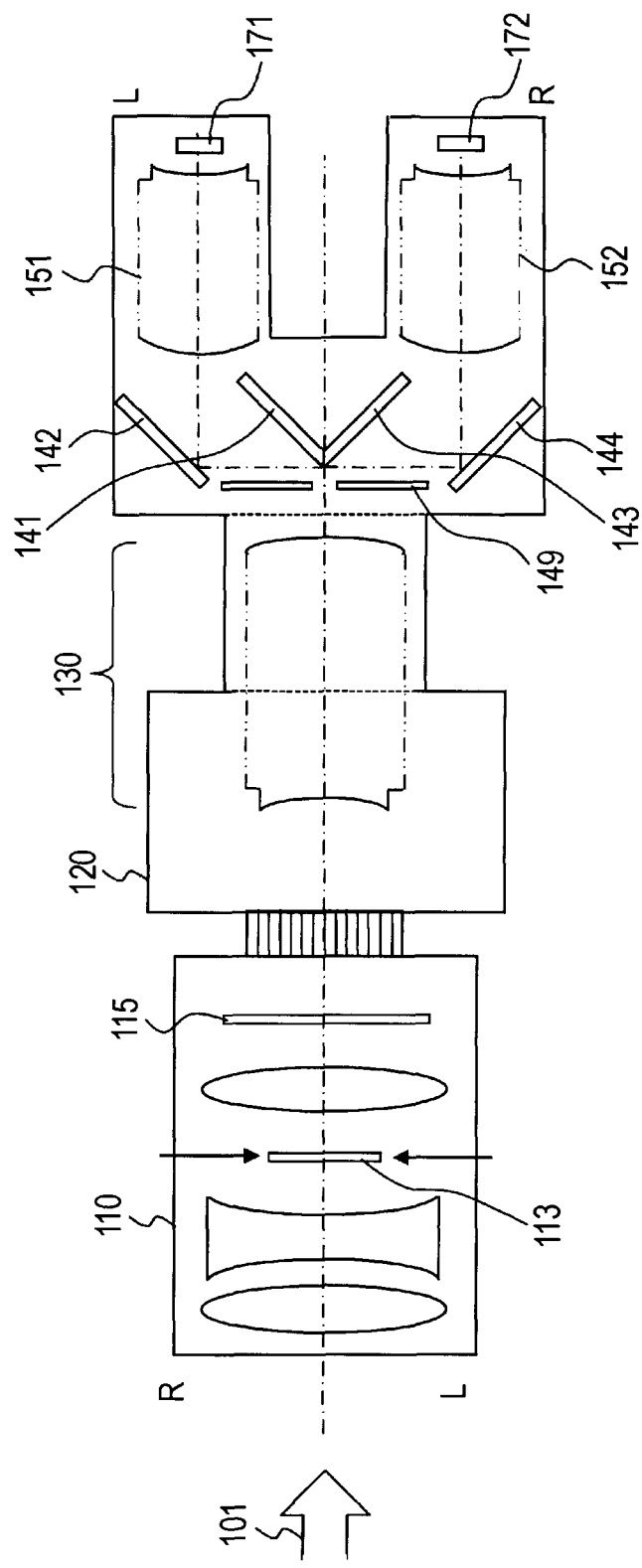
FIG. 1 is a top cross-sectional view of an exemplary image pickup apparatus according to an embodiment of the present invention.

FIG. 1 is a top cross-sectional view of an exemplary image pickup apparatus according to an embodiment of the present invention. The image pickup apparatus receives an incident light ray 101 and forms an image on each of a left imaging device 171 and a right imaging device 172. Thus, the image pickup apparatus generates left video data and right video image data. When the image pickup apparatus faces a subject, the upper section of the drawing is located on the side in the right direction (R) whereas the lower section is located on the side in the left direction (L).

An interchangeable lens 110 can be mounted on the body of the image pickup apparatus via a lens mount 120. The interchangeable lens 110 represents a lens unit that collects the incident light ray 101 output from a subject. The interchangeable lens 110 includes a lens unit including a focus lens to capture an image in focus and a zoom lens for enlarging the image of the subject. The interchangeable lens 110 further includes an aperture 113 for the interchangeable lens 110. Note that the interchangeable lens 110 is an example of an image-capturing lens defined in the claims.

The lens mount 120 is used to mount the interchangeable lens 110 on the body of the image pickup apparatus. The collected light ray temporarily forms an image inside the lens mount 120. The formed image is an inverted image and a mirror-reversed image.

A relay lens unit 130 is disposed downstream of the lens mount 120. The relay lens unit 130 includes a relay lens that relays the light ray collected in the lens mount 120 to the position of an aperture 149. Through the relay lens, the diverging light ray output from a point light source located at the objective focal point is converted into a parallel light ray at the position of the aperture 149. Note that the relay lens unit 130 is an example of a relay lens defined in the claims.

Mirrors 141 to 144 are disposed downstream of the relay lens unit 130. The mirrors 141 to 144 are located at the position of the aperture 149. The mirrors 141 to 144 serve as a beam splitter that separates the collected light ray into left and right light rays. That is, when the subject is looked at from the left side, the light ray is mirror-reversed and is reflected by the mirrors 141 and 142. When the subject is looked at from the right side, the light ray is mirror-reversed and is reflected by the mirrors 143 and 144. Thus, the collected light ray is separated into the left and right rays. The mirrors 141 to 144 are disposed in an area in which the diverging light ray output from the point light source located at the objective focal point (the position of the subject) is converted into a parallel light ray in the lens mount 120. Thus, the light ray is appropriately separated. Note that the aperture 149 is an example of an aperture defined in the claims.

The light rays separated by the mirrors 141 to 144 are input to image forming lenses 151 and 152. That is, when the subject is looked at from the left side, the light ray separated by the mirrors 141 and 142 is input to the image forming lens 151. When the subject is looked at from the right side, the light ray separated by the mirrors 143 and 144 is input to the image forming lens 152. The image forming lenses 151 and 152 form images from the input light rays on the light receiving surfaces of the imaging devices 171 and 172, respectively. The light rays input to the imaging devices 171 and 172 form erected images.

The imaging devices 171 and 172 are photoelectric transducers that convert light rays input from the image forming lenses 151 and 152 to electronic signals, respectively. For example, the imaging devices 171 and 172 are realized by CCDs (Charge Coupled Devices) or CMOS (Complementary Metal Oxide Semiconductor) image sensors.

In this way, according to the embodiment of the present invention, the image pickup apparatus receives the incident light ray 101 output from a subject and separates the incident light ray 101 into left and right light rays using the mirrors 141 to 144. Thus, the image pickup apparatus forms images of left and right video data on the left and right imaging devices 171 and 172.

Figure 2:
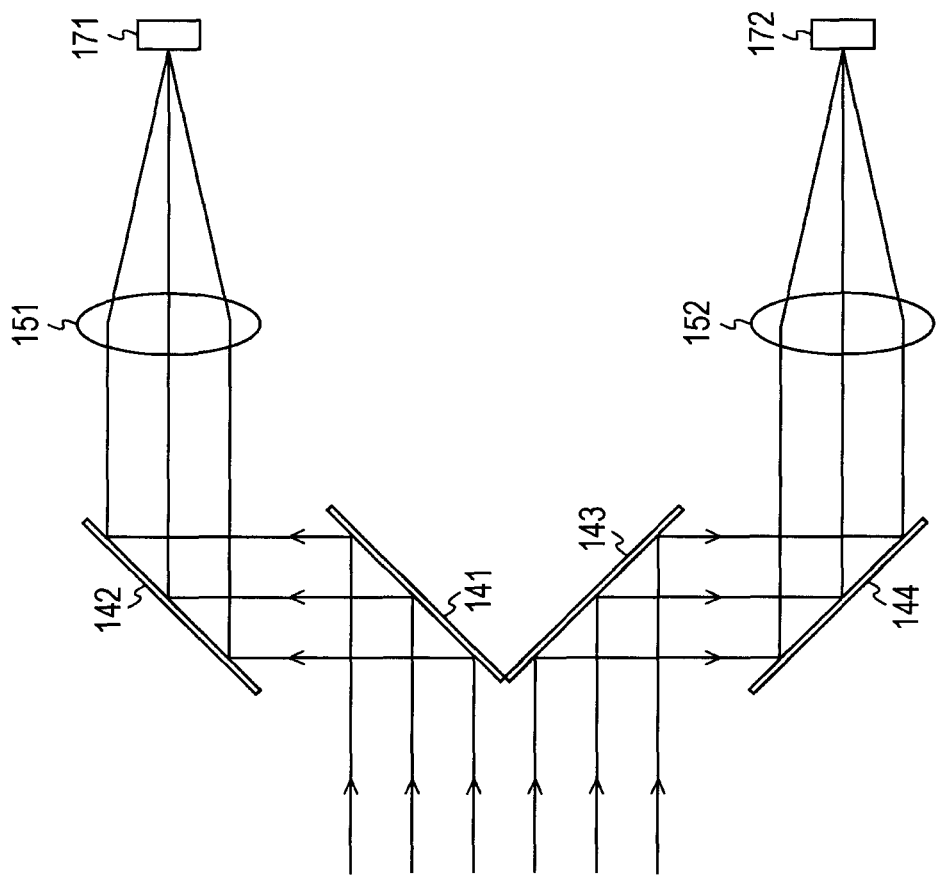
FIG. 2 illustrates a main portion of the exemplary image pickup apparatus according to the embodiment of the present invention.

FIG. 2 illustrates the main portion of the exemplary image pickup apparatus according to the embodiment of the present invention. The light ray transmitted by the relay lens unit 130 is separated into left and right light rays by the mirrors 141 and 143. When a subject is looked at from the left side of the subject, the light ray is reflected by the mirror 141 and is further reflected by the mirror 142. When a subject is looked at from the right side of the subject, the light ray is reflected by the mirror 143 and is further reflected by the mirror 144. These mirrors 141 to 144 are disposed at the position of the aperture 149. The incident light ray is converted into a parallel light ray.

The left light ray reflected by the mirror 142 is made incident on the image forming lens 151. The light ray incident on the image forming lens 151 forms an image on the light receiving surface of the imaging device 171. The right light ray reflected by the mirror 144 is made incident on the image forming lens 152. The light ray made incident on the image forming lens 152 forms an image on the light receiving surface of the imaging device 172.

[Separation of Entrance Pupil]

Figure 3:
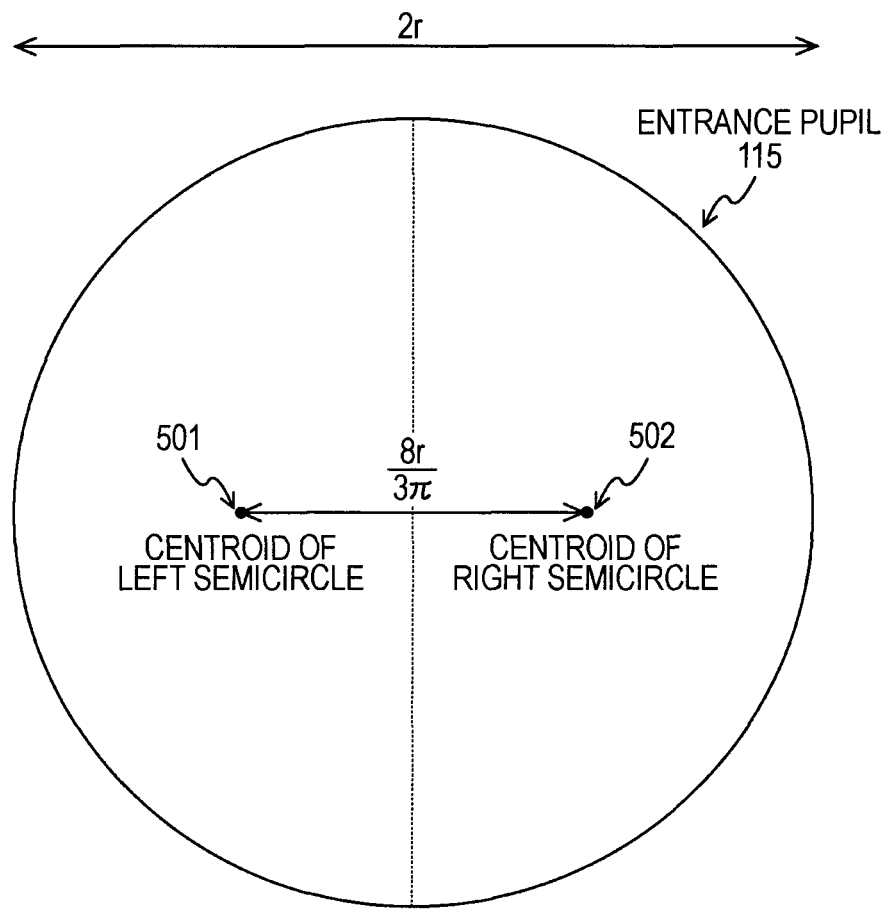
FIG. 3 illustrates an image of an entrance pupil 115 of the image pickup apparatus according to the embodiment of the present invention.

FIG. 3 illustrates an image of an entrance pupil 115 of the image pickup apparatus according to the embodiment of the present invention. The term "entrance pupil" refers to the image of an aperture stop when a lens is looked at from a subject side. In the image pickup apparatus according to the embodiment of the present invention, the image of the aperture 113 is present at a position inside the interchangeable lens 110 so as to serve as the entrance pupil 115. Here, let r denote the radius of a circle corresponding to the entrance pupil 115. Then, the following equation is obtained:

$$2r = f/F \quad \text{(equation 1)}$$

where f represents the focal length, and F represents the F number. Accordingly, it can be found that if the focal length is constant, the diameter 2r of the entrance pupil 115 is inversely proportional to the F number.

According to the embodiment of the present invention, the collected light ray is separated into the left and right rays at the position of the aperture 149. Therefore, a left semicircle and a right semicircle generated by separating the circle of the entrance pupil 115 into the left and right sections are discussed below. As described above, a 3D effect can be achieved by the parallax (the relative parallax) of the two eyes. At that time, the optical axis that determines the parallax passes through centroids of the left and right semicircles. The centroid of the semicircle having a radius of r can be geometrically obtained, and the centroid is located at a distance of $4r/3\pi$ from the center of the circle. Accordingly, the distance between a centroid 501 of the left semicircle and a centroid 502 of the right semicircle (an inter-centroid distance D) can be expressed as follows:

$$D = 8r/3\pi \quad \text{(equation 2)}$$

That is, it can be found that as the aperture 149 is stopped down, the inter-centroid distance D decreases in proportion to the value of the aperture 149. In other words, by changing the diameter of the aperture 149, the 3D effect can be controlled. The result of an experiment conducted to confirm such hypothesis is described below.

[Relationship Between Inter-Centroid Distance and Baseline]

FIG. 4 illustrates a relationship between the inter-centroid distance and the baseline. In this description, the theoretical values of the inter-centroid distances and the experimental values of the baselines are shown for two types of interchangeable lens 110 #A and #B.

A lens #A is a zoom lens having a full-aperture F value of 1.8 and a focal length of 10 to 100 [mm (millimeter)]. The zoom ratio of the lens #A is 10. The focal length at the wide angle end is 10 [mm]. A lens #B is a zoom lens having a full-aperture F value of 2.8 and a focal length of 13.5 to 570 [mm]. The zoom ratio of the lens #B is 42. The focal length at the wide angle end is 13.5 [mm]. The camera-to-subject distance for the two lenses is set to 6.5 [m (meter)].

Using the above-described equation (1) and equation (2), the inter-centroid distances D of the lens #A and #B are 23.6 [mm] and 15.2 [mm], respectively. On the other hand, the baselines of the lenses #A and #B obtained by the experiment using an actual apparatus were 20.0 [mm] and 12.0 [mm], respectively. As can be seen from the result of the experiment, the inter-centroid distance D between the semicircles of the entrance pupil, which is the image of the aperture 113, is substantially the same as the baseline, although the value is smaller than the theoretical value due to, presumably, the effect of diffraction. In addition, equation (2) indicates that the inter-centroid distance D can be changed by changing the diameter of the aperture 149 and, therefore, the baseline can be controlled by changing the diameter of the aperture 149.

According to the configuration of the embodiment of the present invention, the minimum value of the inter-centroid distance D can be about 7 [mm]. If the baseline has substantially the same value, a 3D effect can be provided. In particular, when the camera-to-subject distance is long, the 3D effect cannot be provided unless the length of the baseline is longer than a certain level. As the baseline is increased, the 3D effect becomes clearer when the baseline is about 32 [mm]. In contrast, the background becomes more blurred. In addition, if the baseline exceeds 65 [mm], a puppet theater effect occurs and, therefore, an unnatural image is generated. Accordingly, the range of the baseline in which a 3D image can be seen as a natural image is from about 7 to about 65 [mm].

[Relationship Between Enlargement by Zooming and Parallax]

Figure 5:
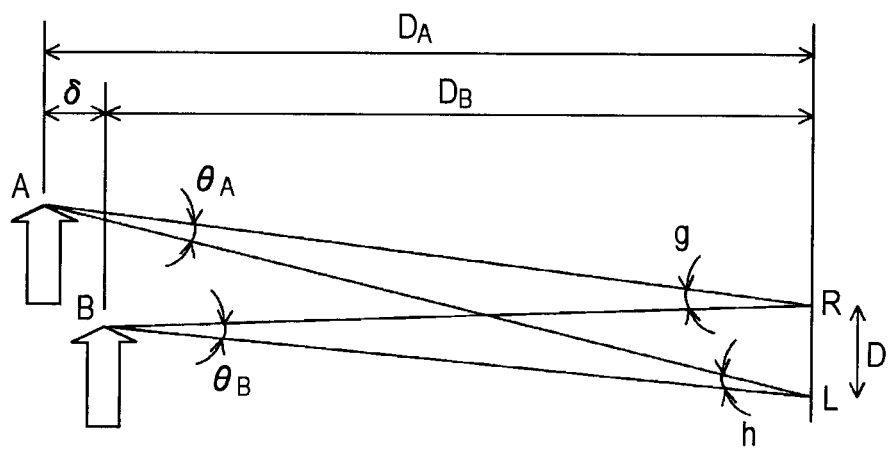
FIG. 5 illustrates a relationship between enlargement by zooming and parallax.
Figure 5:
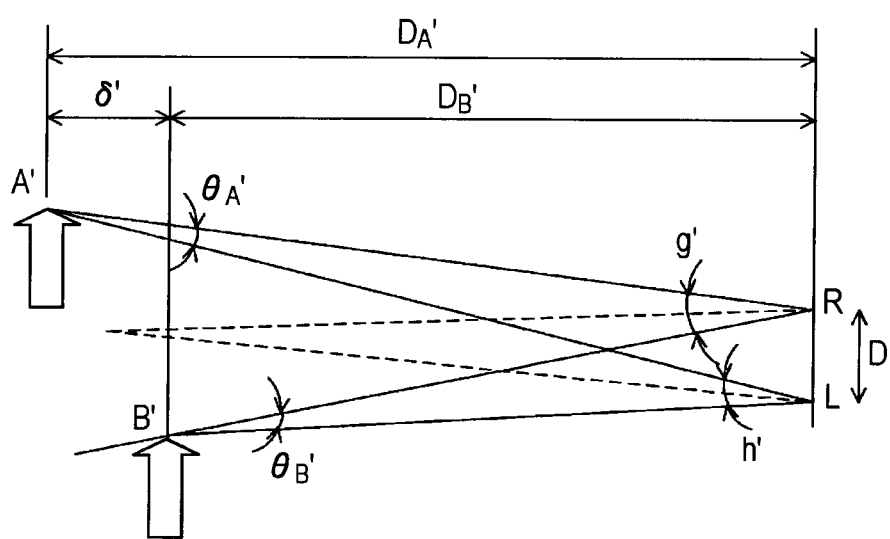

FIG. 5 illustrates a relationship between enlargement by zooming and parallax. In FIG. 5(*a*), L represents the position of the left eye, R represents the position of the right eye, and A and B represent points of the subject. When an angle of vergence $\theta_A$ of the point A is defined by an angle LAR formed by viewing the point A and an angle of vergence $\theta_B$ of the point B is defined by an angle LBR formed by viewing the point A, the parallax (relative parallax) d between the points A and B is given by the following equation:

$$d = \theta_B - \theta_A$$

Let h denote the angle ALB, and let g denote the angle ARB. Then, the angle of vergence $\theta_A$ is substantially the same as h, and the angle of vergence $\theta_B$ is substantially the same as g. Therefore, the following equation can be obtained:

$$d = g - h$$

In addition, let D denote the distance between the two eyes, let $D_A$ denote the distance between the point A and the two eyes, let $D_B$ denote the distance between the point B and the two eyes, and let δ denote the distance between the points A and B when viewed by two eyes. Then, the following expressions can be obtained:

$$d \approx D\delta/(D_A^2 - \delta D_A)$$

Since $D_A$, $D_B \gg D$, the following expression can be obtained:

$$d \approx D\delta/D_A^2$$

FIG. 5(b) illustrates the positional relationship when that in FIG. 5(a) is enlarged n times. In FIG. 5(b), a dash is appended to the symbols if the angles, the positions, and distances are changed after zooming is performed. Since the image is enlarged n times, the following equations are obtained:

$$g' = ng, \text{ and}$$

$$h' = nh.$$

At that time, a parallax d' is expressed as follows:

$$\begin{aligned} d' &= \theta'_B - \theta'_A \\ &= g' - h' \\ &= n(g - h) \\ &= nd \end{aligned}$$

That is, by enlarging the image n times, a parallax of n times the original parallax occurs. This means that as a zooming operation is performed towards a telephoto end, a 3D effect increases. In other words, in zooming image capturing, a proper parallax can be obtained even in the case of a short baseline.

As described above, according to the first embodiment of the present invention, by separating a light ray collected by the single interchangeable lens 110 into left and right rays using the mirrors 141 to 144, the parallax of an image presented to the two eyes can be properly reduced. The parallax obtained in the embodiment of the present invention can be controlled by adjusting the diameter of the aperture 149 and the zoom ratio (the magnification factor) used during a zoom image capturing operation. In general, the sensitivity of the eyes to parallax is significantly high. The normal visual acuity of the eyes is an order of a minute, whereas the parallax acuity is higher than the normal visual acuity by one order (Howard I. P., Rogers B. J.: Stereo Acuity (Chap. 5), Binocular Vision and Stereopsis, p. 162, Oxford University Press, Oxford (1995).) Accordingly, in order to naturally perceive a 3D effect and reduce eye fatigue, it is important to properly reduce the parallax even under the condition in which the parallax is smaller than that in the above-described example.

2. Second Embodiment

Exemplary Configuration of Video Recording and Reproduction System

Figure 6:
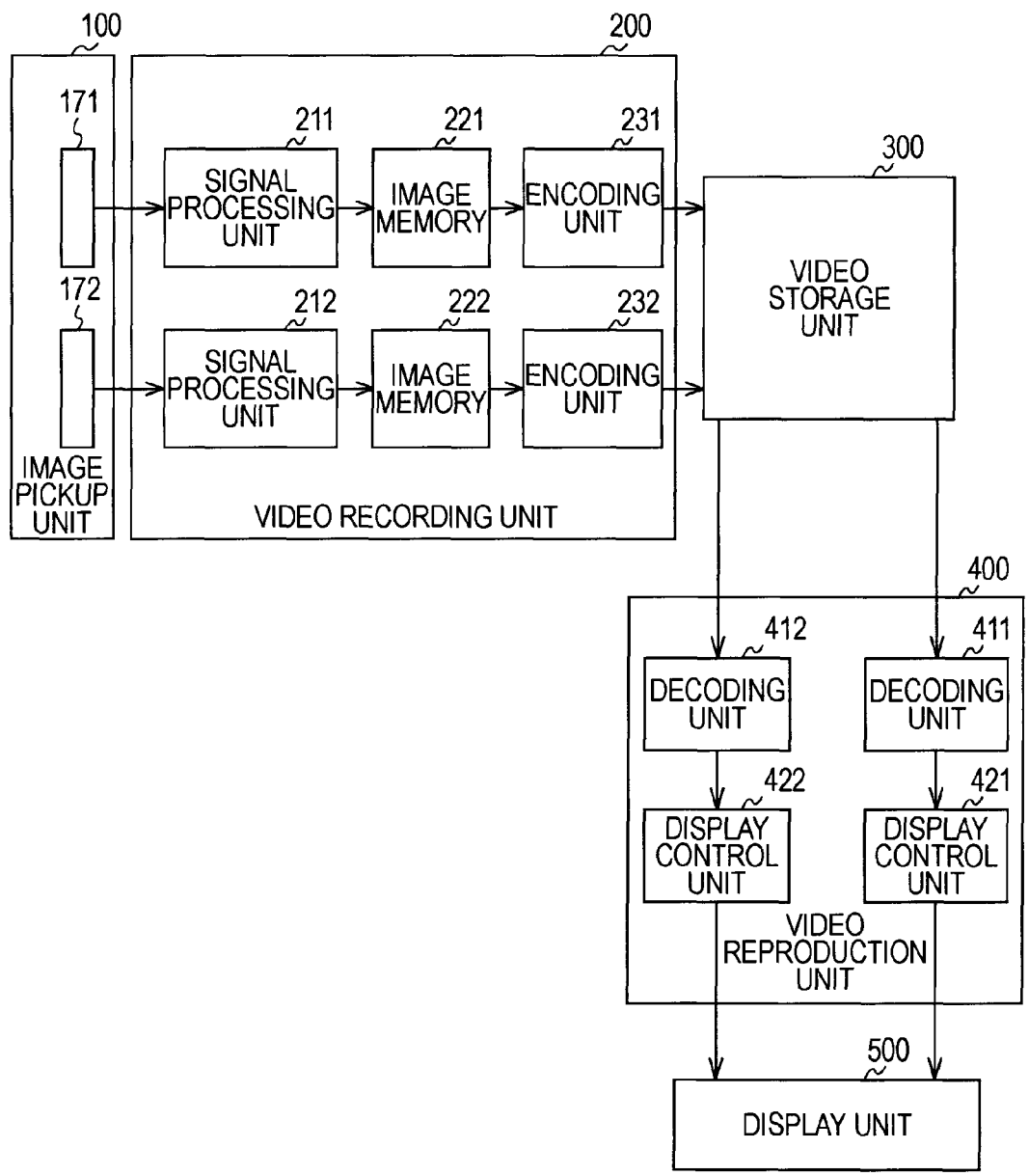
FIG. 6 illustrates an example configuration of a video recording and reproduction system according to an embodiment of the present invention.

FIG. 6 illustrates an example configuration of a video recording and reproduction system according to an embodiment of the present invention. The video recording and reproduction system includes an image pickup unit 100, a video recording unit 200, and a video storage unit 300, and a video reproduction unit 400, and a display unit 500.

The image pickup unit 100 corresponds to the above-described image pickup apparatus. The image pickup unit 100 receives an incident light ray output from a subject and generates the left and right video data using a left imaging device 171 and a right imaging device 172.

The video recording unit 200 records the left and right video data output from the image pickup unit 100 in the video storage unit 300. The video recording unit 200 includes signal processing units 211 and 212, image memories 221 and 222, and encoding units 231 and 232, which correspond to the left and right data, respectively. The signal processing units 211 and 212 receive the left and right video data output from the image pickup unit 100, respectively, and perform predetermined signal processing on the video data. The signal processing units 211 and 212 perform A/D (Analog to Digital) conversion on the video data and correct the white balance. The image memories 221 and 222 are memories that temporarily store the video data processed by the signal processing units 211 and 212, respectively. The encoding units 231 and 232 encode the video data stored in the image memories 221 and 222, respectively, and output the encoded video data to the video storage unit 300.

The video storage unit 300 stores the left and right video data output from the video recording unit 200. The video data stored in the video storage unit 300 is read by the video reproduction unit 400.

The video reproduction unit 400 reads out the video data stored in the video storage unit 300 and reproduces the video data. The video reproduction unit 400 includes decoding units 411 and 412 and display control units 421 and 422 corresponding to the left and right video data. The decoding units 411 and 412 decode the left and right video data read from the video storage unit 300, respectively. The display control units 421 and 422 perform control so that the left and right video data decoded by the decoding units 411 and 412, respectively, are displayed on the display unit 500.

The display unit 500 displays the left and right video data output from the video reproduction unit 400. For example, the display unit 500 has a configuration in which two projectors having circularly or linearly polarized filters attached thereto display two images for the left and right eyes, and the user views the images through circularly or linearly polarized glasses. Alternatively, a flat panel display with a filter may similarly display two images for the left and right eyes at the same time, and the user may view the images using a 3D display unit of a lenticular lens method or a parallax barrier method without using glasses. In this way, according to the embodiment of the present invention, by displaying the left and right images at the same time instead of alternately displaying the left and right images, eye fatigue can be reduced.

Furthermore, according to the embodiment of the present invention, by employing a high frame rate from when video data is generated by the image pickup unit 100 to when the video data is displayed by the display unit 500, blur and jerkiness of an image caused by a motion can be prevented. Motion blur is frequently caused by reduction in an MTF (Modulation Transfer Function) and, in particular, by slipping of a video image on the retina occurring when a moving subject is viewed while following the subject on a device performing hold-type display (i.e., visual tracking). As used herein, the term "hold-type display" refers to a display state in which video is continuously displayed using a film or a liquid crystal projector during a frame period. In addition, the term "jerkiness" refers to loss of smoothness of video motion and the occurrence of jerky video motion. Jerkiness frequently occurs when video captured using a high shutter speed is viewed with a fixed line of sight (i.e., fixed viewing). Such degradation of the quality of a moving image is related to the frame rates of image capturing and image displaying, the aperture ratio (aperture time/frame time) of the camera when an image is captured, and visual features.

In general, 24 frames per second (24 Hz) are used for movies, and 60 fields per second (60 Hz) are used for television programs as a frame rate. According to the embodiment of the present invention, in order to reduce blur and jerkiness caused by motion, a captured image is generated from an electronic signal at a rate of 60 frames per second (60 Hz) or higher and, more preferably, 230 to 250 frames per second (240 Hz±10 Hz). In this way, a problem of an insufficient resolution in the time direction is solved.

As described above, according to the second embodiment of the present invention, by setting the parallax of an images presented to the two eyes to a proper level and employing a high frame rate, a high-quality 3D image that can be easily viewed in the same way a user looks at the natural world and that has low aberration can be captured. In addition, the optical axis is not practically changed by the zoom ratio and, therefore, image processing, such as moving the position of an image in accordance with the zoom ratio, is not required. Thus, high-precision zoom effect can be easily obtained.

Note that the embodiments of the present invention are only examples for illustrating the present invention. As described in the embodiments of the present invention, there is a correspondence between an element of the embodiments of the present invention and an element of the invention defined in the claims. Similarly, there is a correspondence between an element of the invention defined in the claims and an element and an element of the embodiments of the present invention having the same name. However, it is to be understood that the invention is not limited to the disclosed exemplary embodiments. The present invention can be practiced with various modifications within the spirit and scope of the invention.

EXPLANATION OF REFERENCE NUMERALS 100 image pickup unit, 101 incident light ray, 110 interchangeable lens, 120 lens mount, 130 relay lens unit, 141-144 mirror, 151, 152 image forming lens, 171, 172 imaging device, 200 video recording unit, 211, 212 signal processing unit, 221, 222 image memory, 231, 232 encoding unit, 300 video storage unit, 400 video reproduction unit, 411, 412 decoding unit, 421, 422 display control unit, 500 display unit

The invention claimed is:

1. An image pickup apparatus comprising:
an image-capturing lens configured to collect a light ray output from a subject, the image-capturing lens comprising:
  a focus lens;
  a zoom lens disposed downstream from the focus lens; and
  a first aperture disposed between the focus lens and the zoom lens, the focus lens and the zoom lens being configured to generate an image of the first aperture that serves as an entrance pupil located at a position inside the image capturing lens;
a relay lens configured to transmit the collected light ray;
a second aperture configured to control an amount of the transmitted light in an area in which a diverging light ray output from a point of the subject is converted into a parallel light ray;
a mirror configured to separate, into left and right rays, the light ray having the amount of light controlled in the area in which a diverging light ray output from a point of the subject is converted into a parallel light ray;
two image-forming lenses configured to form images from the left and right light rays; and
two image devices configured to convert the light rays forming the images into electronic signals representing the images.

2. The image pickup apparatus according to claim 1, wherein the second aperture controls the amount of the transmitted light so as to change a distance between optical axes of the two separate light rays.

3. The image pickup apparatus according to claim 1, wherein the second aperture controls the amount of the transmitted light so that a distance between optical axes of the two separate light rays ranges from about 7 to about 65 millimeters.

4. The image pickup apparatus according to claim 1, wherein the zoom lens that enlarges the light ray output from the subject and wherein a relative parallax between the two images converted by the imaging devices is controlled by the zoom lens.

5. The image pickup apparatus according to claim 1, wherein each of the plurality of imaging devices generates captured images from the electronic signals at a rate of 60 frames per second or higher.

6. The image pickup apparatus according to claim 5, wherein each of the plurality of imaging devices generates captured images from the electronic signals at a rate between 230 frames per second and 250 frames per second.

7. A video recording and reproduction system comprising:
an image-capturing lens configured to collect a light ray output from a subject, the image-capturing lens comprising:
  a focus lens;
  a zoom lens disposed downstream from the focus lens; and
  a first aperture disposed between the focus lens and the zoom lens, the focus lens and the zoom lens being configured to generate an image of the first aperture that serves as an entrance pupil located at a position inside the image capturing lens;
a relay lens configured to transmit the collected light ray;
a second aperture configured to control an amount of the transmitted light in an area in which a diverging light ray output from a point of the subject is converted into a parallel light ray;
a mirror configured to separate, into left and right rays, the light ray having the amount of light controlled in the area in which a diverging light ray output from a point of the subject is converted into a parallel light ray;
two image-forming lenses configured to form images from the left and right light rays;
two imaging devices configured to convert the light rays forming the images into electronic signals representing the images;
a video recording unit configured to record the electronic signals in a storage unit in the form of frames of left and right video data; and
a video reproduction unit configured to reproduce and simultaneously display the left and right video data recorded in the storage unit.

* * * * *